United States Patent
Morgen

(10) Patent No.: US 10,508,734 B2
(45) Date of Patent: Dec. 17, 2019

(54) METHOD FOR OPERATING A TRANSMISSION DEVICE FOR A MOTOR VEHICLE, AND CORRESPONDING TRANSMISSION DEVICE

(71) Applicant: AUDI AG, Ingolstadt (DE)

(72) Inventor: Christian Morgen, München (DE)

(73) Assignee: AUDI AG, Ingolstadt (DE)

( * ) Notice: Subject to any disclaimer, the term of this patent is extended or adjusted under 35 U.S.C. 154(b) by 196 days.

(21) Appl. No.: 15/536,909

(22) PCT Filed: Dec. 17, 2015

(86) PCT No.: PCT/EP2015/080280
§ 371 (c)(1),
(2) Date: Jun. 16, 2017

(87) PCT Pub. No.: WO2016/097179
PCT Pub. Date: Jun. 23, 2016

(65) Prior Publication Data
US 2019/0093760 A1    Mar. 28, 2019

(30) Foreign Application Priority Data

Dec. 19, 2014  (DE) .................. 10 2014 019 127

(51) Int. Cl.
*F16H 61/02*      (2006.01)
*B60W 30/18*      (2012.01)
*B60W 50/08*      (2012.01)

(52) U.S. Cl.
CPC ... *F16H 61/0213* (2013.01); *B60W 30/18027* (2013.01); *B60W 50/087* (2013.01);
(Continued)

(58) Field of Classification Search
CPC .......... F16H 61/0213; F16H 2061/023; B60W 30/18027; B60W 50/087;
(Continued)

(56) References Cited

U.S. PATENT DOCUMENTS 4,658,676 A    4/1987   Furusawa et al.
4,941,096 A    7/1990   Ito et al.
(Continued)

FOREIGN PATENT DOCUMENTS

CN    102182822 A    9/2011
DE    102007031725 A1    1/2009
(Continued)

OTHER PUBLICATIONS

International Search Report dated Mar. 22, 2016 in corresponding PCT/EP2015/080280; 15 pages.
(Continued)

*Primary Examiner* — Tinh Dang
(74) *Attorney, Agent, or Firm* — Maier & Maier, PLLC

(57) ABSTRACT

A method for operating a transmission device for a motor vehicle. A driving gear is selected from a quantity of driving gears and set to the transmission. At the same time, in a normal operating state, the driving gear quantity is compiled from a specific number of driving gears contained in a total quantity of the driving gears, containing all of the driving gears. The driving gear quantity is compiled as a function of at least one state variable of the motor vehicle.

7 Claims, 1 Drawing Sheet

(52) U.S. Cl.
CPC .............. *B60W 2510/1005* (2013.01); *B60W 2510/107* (2013.01); *B60W 2510/1025* (2013.01); *B60Y 2400/71* (2013.01); *B60Y 2400/76* (2013.01); *B60Y 2400/77* (2013.01); *F16D 2500/108* (2013.01); *F16D 2500/30806* (2013.01); *F16H 2061/023* (2013.01)

(58) Field of Classification Search
CPC ..... B60W 2510/1005; B60W 2510/107; F16D 2500/108; F16D 2500/30806; B60Y 2400/71; B60Y 2400/76; B60Y 2400/77
See application file for complete search history.

(56) References Cited

U.S. PATENT DOCUMENTS

| | | | | |
|---|---|---|---|---|
| 5,070,746 | A * | 12/1991 | Milunas | F16H 61/0213 192/82 T |
| 5,720,696 | A * | 2/1998 | Robinson | F16H 61/0213 477/120 |
| 6,415,214 | B2 * | 7/2002 | Nishimura | B60W 10/02 180/65.6 |
| 7,735,388 | B2 * | 6/2010 | Sakamoto | F16H 61/12 74/339 |
| 8,554,431 | B2 * | 10/2013 | Eriksson | F16H 61/0213 180/338 |
| 8,751,119 | B2 * | 6/2014 | Takashiro | F16H 59/08 476/1 |
| 9,810,164 | B2 * | 11/2017 | Aoki | F02D 29/02 |

FOREIGN PATENT DOCUMENTS

| | | |
|---|---|---|
| DE | 102009026788 A1 | 12/2010 |
| DE | 102010041969 A1 | 4/2012 |
| EP | 1134458 A2 | 9/2001 |
| EP | 2307768 A1 | 4/2011 |
| WO | 02087917 A1 | 11/2002 |
| WO | 2007/030057 A1 | 3/2007 |

OTHER PUBLICATIONS

German Examination Report dated Dec. 3, 2015 in corresponding DE10 2014 019 127.3; 6 pages.

"Entwicklung Getriebe; Mercedes Powershift Neue Getriebegeneration automatisierter Schaltgetriebe. ATZ: Springer, Jan. 2008 (Jahrgang 110). 38-44.—ISNB keine", 7 pgs.

Chinese Office Action and Search Report dated Jun. 1, 2018, in connection with corresponding CN Application No. 201580068743.5 (8 pgs.).

International Preliminary Report on Patentability dated Jun. 29, 2017, in connection with corresponding international application No. PCT/EP2015/080280 (9 pgs.).

Office Action dated Aug. 5, 2019, in corresponding Chinese Application No. 201580068743.5; 15 pages.

Office Action dated Jan. 24, 2019 in corresponding Chinese Application No. 201580068743.5; 10 pages.

* cited by examiner

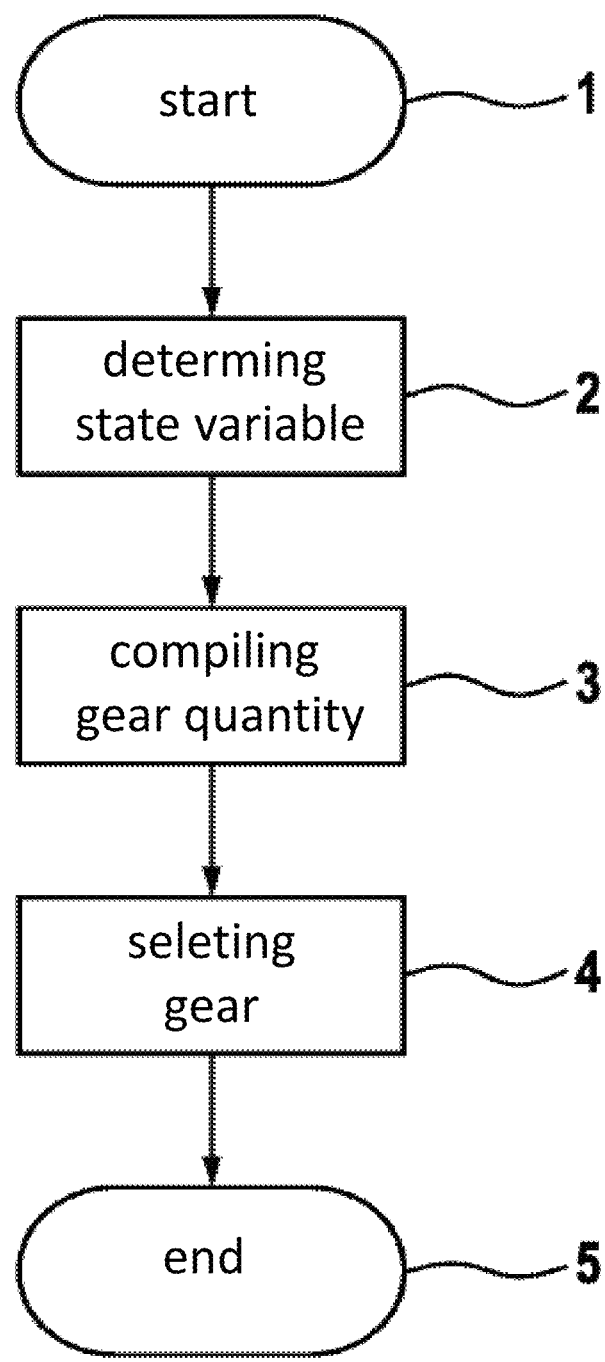

METHOD FOR OPERATING A TRANSMISSION DEVICE FOR A MOTOR VEHICLE, AND CORRESPONDING TRANSMISSION DEVICE

FIELD

The invention relates to a method for operating a transmission device for a motor vehicle, wherein a gear is selected from a plurality of gears and set up in a transmission. The invention further relates to a transmission device for a motor vehicle.

BACKGROUND

The transmission device is assigned to the motor vehicle and it thus forms a component of the motor vehicle. The transmission device is in particular in an operative connection between a drive device of the motor vehicle and at least on driven axle of the motor vehicle. It goes without saying that multiple driven axles can be also provided. In this case, the transmission device has an operative connection arranged between the drive device and at least one of the driven axles, in particular all of the driven axles of the motor vehicle.

The drive device in this case serves to provide a torque for driving the motor vehicle. This torque is transmitted via the transmission device or via the gear assigned to the transmission device. The transmission device serves to set different transmission ratios between the drive device and at least one driven axle. Each of these transmission ratios is associated with a driving gear. Usually there are multiple driving gears, wherein a transmission ratio is assigned to each gear that is different from the transmission ratios of other driving gears. The driving gears include for example the forward driving gear. In addition, at least one reverse gear is assigned to the gears.

Different driving gears or gear ratios can be thus set by means of the transmission. In this respect, the transmission is provided as a manual transmission. In order to set a certain gear on the transmission, for example to start up the motor vehicle, the gear is selected from the available driving gears, which are preferably provided as a plurality of driving gears, in particular from all of the driving gears provided by the transmission. After that, the selected driving gear is set to the transmission so that the transmission ratio associated with the driving gear is then present between the drive device and at least one driven axle. The vehicle is thus started up for example when the motor vehicle is or should be set in motion from a standstill state.

SUMMARY OF THE DISCLOSURE

The objective of the invention is to propose a method for operating a transmission device which has advantages over other method, in particular because it enables a higher driving comfort for driving the motor vehicle.

In particular, in a normal operating mode, the quantity of driving gears is compiled from a certain number of driving gears that are contained in the total amount of the gears of the transmission, wherein the quantity of the driving gear is set as a function of at least one state variable of the motor vehicle.

The total driving gear quantity is compiled of all of the driving gears contained in the total amount of the driving gears.

This is carried out as a function of at least one state variable. Accordingly, the quantity of the driving gears, in particular in the normal operating state, consists of a certain number of the driving gears that are contained in the total quantity of the driving gears. The number of the gears contained in the quantity of the driving gears can be essentially arbitrary. Preferably, this number corresponds at least to one, and at the most to the number of the driving gears contained in the total gear quantity.

Overall, in the normal operating state, the possibility is created to limit the number of the driving gears available for being set to a transmission depending on the state variables of the motor vehicle, so that not all the driving gears contained in the total driving gear quantity can be set to the transmission. In other words, this means that the driving gear quantity is compiled as a function of at least one state variable of the motor vehicle from the amount of contained driving gears, wherein the total driving gear quantity contains all the gears of the transmission.

It is particularly preferred when in a further development of the invention, the method is carried out within the context of an independent software module. The compilation of the quantity of the driving gears is thus carried out exclusively as a function of at least one state variable. An operating mode can be selected between a first operating mode and second operating mode by means of a switch. The switch is preferably provided in the form of a software switch, and preferably in the form of a variable, in particular a Boolean variable. The switch can be activated by the driver of the motor vehicle and/or it can be selected by a driver assistance device, which selects the operating mode to be implemented from the first operating mode and from the second operating mode.

In the first operating mode, the driving gear quantity is compiled from the available quantity of driving gears and the software module is thus activated to this extent. In the second operating mode, however, the software module is deactivated. In this case, the driving gear quantity should correspond to the total quantity of driving gears. The software module has as a single input variable for example the operating mode to be implemented, or the variables described above, including at least one state variable, as well as the total quantity of driving gears. The only output variable that is provided is the driving gear quantity. In this respect, the software module is designed for example so that it is fully encapsulated in other software modules.

This means that preferably, the selection of the gears can to be set to the transmission is performed separately from the software module, in particular from another software module. This can be done for example by means of a characteristic diagram, in particular as a function of an operating feature of the transmission device and/or of the drive device, wherein the driving gear to be set is selected from a quantity of driving gears and set to the transmission. As an alternative, it goes without saying that it is also possible that an optimal driving gear can be determined with respect to an optimal transmission ratio based on the operating feature and the next driving gear after this optimal driving gear is determined from the driving gear quantity and set to the transmission. In any case, the compilation of the driving gear quantity is carried out from the total quantity of driving gears on the one hand, so that on the other hand, the selection and the setting of the driving gears to the transmission is carried out independently.

According to a preferred embodiment of the invention, one smallest driving gear of the driving gear quantity is greater than the smallest gear of the total driving gear quantity. This is to be in particular understood so that the transmission ratio of the smallest driving gear of the driving gear quantity is greater than the transmission ratio of the smallest driving gear of the total driving gear quantity. In this manner, the start-up operation of the motor vehicle can be carried out for example in the normal operating mode with a driving gear that is greater than the smallest driving gear contained in the total driving gear quantity. With respect to the start-up operation, it is preferred when the start-up operation is carried out with the smallest driving gear available in the quantity of the driving gears.

According to another preferred embodiment of the invention, the smallest driving gear of the driving gear quantity corresponds to the next smallest driving gear of the total driving gear quantity. Such an embodiment has already been mentioned. In other words, the quantity of the driving gears is provided with all of the driving gears of the total driving gear amount, with the exception of the smallest driving gear, or of the smallest driving gears. For example, the smallest driving gear of the total driving gear quantity corresponds to the next driving gear following the smallest driving gear in the total driving gear quantity.

In this respect, it can be for example provided that the total quantity of driving gears includes at least the driving gears "one", "two" and "three" (which can be expanded arbitrarily, for example to four driving gears, five driving gears, six driving gears, seven driving gears, eight driving gears or nine driving gears), while the gear quantity for the smallest driving gears is provided with the driving gear "two" or "three" (and additionally with the other driving gears of the total gear quantity), so that in the first case are used at least the driving gears "two" and "three".

In this manner, as a function of the state variable in the normal operating mode, in the start-up operation of the motor vehicle, the smallest available driving gear is engaged with a larger driving gear and thus also with a larger transmission ratio than what is provided with the total driving gear amount.

According to a further development of the invention, the smallest driving gear of the total driving gear amount is designed as a start-up gear. This means that the smallest driving gear of the quantity of driving gears is selected in such a way that the motor vehicle can be reliably started when this driving gear is set to the transmission. In this respect, the smallest driving gear of the quantity of driving gears can be also selected as a function of the inclination of the ground, so that the smallest driving gear of the driving gear quantity is preferred as being greater the more the start-up operation of the vehicle is supported by the gravity flow, for example because the motor vehicle is located on a steep descending slope. If, on the other hand, the ground inclination indicates a rising gradient to be overcome by the motor vehicle during the start-up operation of the vehicle, the smallest driving gear of the driving gear quantity is selected with a greater the ground inclination.

In another embodiment according to the invention, as a state variable can be used a driving gear that is momentarily set to the transmission, or a selected driving program and/or a selected driving mode, a ground inclination, a transmission temperature, an ambient temperature, a trailer operating value, an ambient air pressure and/or a geodetic height and/or a driver profile can be used. At least one of these state variables is used during the compilation of the driving gear quantity from the driving gears contained in the total driving gear quantity. However, it is particularly preferred when a plurality of the state variables mentioned above are used, in particular when all of the mentioned state variables are used.

For example, the driving gear that is currently set to the transmission can be used as a state variable. In particular, the driving gear that is currently set to the transmission is always included in the quantity of driving gears, even when this should be the smallest driving gear of the total quantity of driving gears. In particular, the currently set driving gear is included in the driving gear quantity when this driving gear should not be taken into account, for example based on the basis of at least one other state variable. Such an approach thus makes it possible to avoid unnecessary changes of driving gears.

In addition or as an alternative, the selected driving program and/or the selected driving mode can be also used for this purpose. The driving program, in particular a program obtained from a permissible quantity of driving programs, or the specific driving mode can be set. The transmission device can be for example addressed via a so-called "shift by wire" control. This means that a purely electronic and/or optical communication takes place between a selector lever and the transmission device, in particular because there is no mechanical and/or hydraulic communication. However, the selector level is preferably provided also in other embodiments of the control, for example with a mechanical and/or manual control.

A driver of the motor vehicle can set the desired driving program on the selector lever, in particular by shifting the selector lever to a specified position. The position of the selector lever is then preferably transmitted to the transmission device electronically and/or optically, in particular exclusively in this manner. For example, the selector lever can be arranged in a parking position "P", in a neutral position "N", as well as in forward travel direction "D". Accordingly, these positions can be provided for a parking program, a driving program for driving in reverse, a neutral program, and a forward driving program. The program to be executed can be of course selected also in a different manner.

It is preferred when additionally or alternatively, a driving mode is selected. This mode can describe for example the desired driving mode in particular as a sport, efficient, or automatic mode. In the last case, for example, the mode is automatically switched to or it is blended between the sport and efficient driving mode, in particular steplessly. For example, it can be provided that when the forward driving position is selected and the driving mode is set to sport mode, all driving gears in the total driving gear quantity will be transferred to the driving gear quantity. However, if the driving mode corresponds instead of the sport driving mode to the efficient driving mode, then for example at least the smallest driving gears of the total driving gear quantity, in particular the smallest driving gear, will not be considered during the compilation, which is to say not included in the quantity of driving gears.

The ground inclination can be also used as a state variable, as has been already described above. For example, if the motor vehicle is constantly oriented in the descending direction of the slope, the acceleration of the motor vehicle in the direction of the travel is supported by the gravity, which means that a smaller driving gear can be selected than the smallest driving gear of the total driving gear quantity. The smallest driving gear amount to be selected can be in this case bigger the greater and more pronounced the inclination of the ground, which is to say the more the acceleration of the motor vehicle is supported by the gravity.

Additionally or alternatively, the temperature of the transmission can be also used as a state variable. Under the term transmission temperature is in this case to be understood the temperature of the lubricant sump, the temperature of the electronics, or a converter model temperature. The ambient temperature can also have an influence on the compilation of the quantity of driving gears. The greater the smallest driving gear of the driving gear quantity, the warmer the start-up clutch of the motor vehicle will be, which is provided for example between the drive device and the transmission device. For example, the smallest driving gear of the driving gear quantity can be selected in such a way that it is greater the lower the ambient temperature.

An analogous concept is used also for the lubricant sump temperature, for the temperature of electronic components and for the temperature of the converter model. For example, the model temperature can be formed from at least two named temperatures creating a model temperature. The higher the model temperature, the smaller the smallest driving gear that is selected from the total quantity of driving gears to be included in the driving gear quantity.

The operating value of the trailer indicates whether a trailer is or is not coupled to the motor vehicle. If the trailer operating value indicates that the motor vehicle is coupled with a trailer, the driving gear quantity is preferably set to be equal to the total driving gear quantity because in this case, the motor vehicle mass necessitates the use of smaller driving gears for the acceleration of the motor vehicle. Other variables can be also used for the compilation of the driving gear quantity.

Additionally or alternatively, the profile of the driver can be also used. The driver profile is determined for instance based on the acceleration of the motor vehicle in previous start-up operations, for example on the basis of the average acceleration during the start-up operation. A characteristic value is determined from this acceleration, which describes whether the preferred mode is an efficient driving mode or a sport driving mode. It is particularly preferred when a driver recognizing feature is provided, which recognizes the driver who is currently performing the motor vehicle driving operation. The corresponding driver profile is thus selected depending on the recognized driver. According to the embodiments mentioned above, the profile of the driver can be matched to the driving style of the current driver. It is preferred when the driver profile is temporarily stored so that it will be available as soon as the driving operation is performed again by the driver.

It may be also provided that the driver type is realized in a separate software module. In this context, the operation can proceed as described in the embodiments above. The driver type is in this case preferably provided on an interface. Within the context of a further development of the invention, the driver type provided through an interface can be subsequently used as a corresponding variable and applied as a state variable.

According to a preferred embodiment of the invention, when an accelerator pedal position threshold is exceeded, the accelerator pedal position is used to switch over to an alternative operating mode, in which the driving gear quantity corresponds to the total driving gear quantity. The accelerator pedal position describes the position of an accelerator pedal. Under accelerator pedal is to be understood for example the gas pedal of the motor vehicle. In this respect, the position of the accelerator pedal thus represent the position of the gas pedal. The more the accelerator pedal is pressed, the farther the accelerator pedal position will be.

If the accelerator position exceeds the accelerator position threshold, the operation is switched over to the alternative operating mode, preferably from the normal operating mode. In the alternative operating mode, the driving gear quantity always corresponds to the total quantity of driving means.

Finally, it can be also provided according to another embodiment that the compilation of the driving gear quantity is carried out when a driving speed of the motor vehicle is below a driving speed threshold of the motor vehicle. On the other hand, if the driving speed is above the driving speed threshold, it can be provided that the driving gear quantity corresponds to the total quantity of driving means. However, it can be also provided that the compilation of the driving gear quantity is carried out only in the standstill state of the motor vehicle because variables that are present in the subsequent start-up operation of the motor vehicle can be reliable closed in this state.

The invention further relates to a transmission device for a motor vehicle, in particular to carrying out the method described above, wherein one driving gear is to be selected from a driving gear quantity and set to a transmission. In this case, it is provided that the driving gear quantity is compiled in a normal operating state from a certain number of driving gears contained in a driving gear quantity, wherein the total driving gear quantity contains all of the driving gears of the transmission, and wherein the transmission is designed so as to compile the driving gear quantity as a function of at least one state variable of the motor vehicle.

The advantages of such a configuration of the transmission device have already been pointed out.

Both the transmission device as well as the method can be further developed according to the embodiments described above, so that reference is made to them in this respect.

BRIEF DESCRIPTION OF THE DRAWING

The FIGURE shows a flowchart of a method for operating a transmission device for a motor vehicle.

DETAILED DESCRIPTION OF THE DRAWING

The flowchart shown in the FIGURE described a method for operating a transmission device for a motor vehicle. The method begins at a starting point 1. At least one state variable of the motor vehicle is determined within the scope of operation 2. After that, a driving gear quantity, which is to say a quantity of driving means, is compiled in operation 3. This compilation is carried out based on the driving gears obtained in a total driving gear quantity, so that the total driving gear quantity comprises the total quantity of all of the driving gears.

Depending on the at least one variable determined as described above, it is determined whether individual driving gears from the total driving gear quantity will be accepted or not. For example, the ground inclination may indicate an inclination at which the acceleration of the motor vehicle is supported in the driving direction by the influence of gravity, so that for example all of the driving gears will be transferred from the total driving gear quantity to the driving gear quantity with the exception of the smallest driving gear. After that, within the scope of operation 4, one driving gear is selected from the driving gear quantity compiled as described above and it is set to the transmission. The process is then ended at the end point 5.

With the method described above, a start-up operation of the motor vehicle can be designed in a much more comfortable manner because a sudden jump occurring with the pulling force from the smallest driving gear of the total driving gear quantity to the next smallest driving gear of the total driving gear quantity can be avoided.

The invention claimed is:

1. A method for operating a transmission device for a motor vehicle, comprising:
a driving gear is selected from a driving gear quantity and set to a transmission, wherein in a normal operating mode, the driving gear quantity is compiled from a specified number of driving gears contained in a total driving gear quantity, wherein the total driving gear quantity contains all of the driving gears of the transmission, and wherein the driving gear quantity is compiled as a function of at least one state variable of the motor vehicle, and wherein the driving gear is selected independently from the compiling of the driving gear quantity.

2. The method according to claim 1, wherein a smallest driving gear of the driving gear quantity is greater than a smallest driving gear of the total driving gear quantity.

3. The method according to claim 2, wherein the smallest driving gear of the driving gear quantity corresponds to the driving gear following the smallest driving gear of the total driving gear quantity.

4. The method according to claim 2, wherein the smallest driving gear of the driving gear quantity is designed as a start-up gear.

5. The method according to claim 1, wherein the state variable is at least one of the driving gear that is currently set to the transmission, a selected driving program, a selected driving mode, an ambient temperature, an operating value of a trailer, an ambient air pressure, a geodetic height and a driver profile.

6. The method according to claim 1, wherein when an accelerator pedal threshold value is exceeded by an accelerator pedal position, the normal operating mode is switched to an alternative operating mode in which the driving gear quantity corresponds to the total driving gear quantity.

7. The method according to claim 1, wherein the compilation of the driving gear quantity is carried out when a driving speed of the motor vehicle is below a driving speed threshold.

* * * * *